United States Patent
Weitzel et al.

(10) Patent No.: US 6,441,082 B1
(45) Date of Patent: Aug. 27, 2002

(54) PROCESS FOR PREPARING AQUEOUS POLYMER DISPERSIONS

(75) Inventors: Hans-Peter Weitzel, Reischach; Reiner Figge, Ampfing, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/402,579

(22) PCT Filed: Apr. 24, 1998

(86) PCT No.: PCT/EP98/02436

§ 371 (c)(1),
(2), (4) Date: Oct. 6, 1999

(87) PCT Pub. No.: WO98/49205

PCT Pub. Date: Nov. 5, 1998

(30) Foreign Application Priority Data

Apr. 30, 1997 (DE) .......................................... 197 18 289

(51) Int. Cl.⁷ ......................... C08F 2/24; C09D 157/00; C09J 157/00
(52) U.S. Cl. ....................... 524/458; 524/563; 524/832; 526/201; 526/330; 526/331
(58) Field of Search ................................ 524/458, 563, 524/832; 526/201, 330, 331

(56) References Cited

U.S. PATENT DOCUMENTS

| 3,965,032 | A |   | 6/1976  | Gibbs et al. |
|-----------|---|---|---------|--------------|
| 4,009,138 | A |   | 2/1977  | Kobashi et al. |
| 4,397,968 | A |   | 8/1983  | Eck et al. |
| 4,528,315 | A |   | 7/1985  | Eck et al. |
| 4,532,295 | A |   | 7/1985  | Brabetz et al. |
| 5,369,163 | A | * | 11/1994 | Chiou et al. ................. 524/458 |
| 5,462,978 | A |   | 10/1995 | Penzel et al. |
| 5,635,566 | A |   | 6/1997  | Gerharz et al. |
| 5,733,462 | A | * | 3/1998  | Mallon et al. ............... 210/728 |

FOREIGN PATENT DOCUMENTS

| CA | 2169129    | 8/1996  |
| DE | 25 15 109  | 10/1975 |
| DE | 196 08 911 | 9/1997  |
| DE | 26 18 898  | 11/1998 |
| EP | 0 133 899  | 3/1985  |
| EP | 0 062 106  | 7/1986  |
| EP | 0 629 650  | 12/1994 |
| EP | 0 655 464  | 5/1995  |
| EP | 0 671 435  | 9/1995  |
| EP | 0 206 814  | 12/1995 |
| EP | 0 727 441  | 8/1996  |
| WO | 84/00369   | 2/1984  |

OTHER PUBLICATIONS

Derwent Abstract corresponding to DE–A 196 08 911 (AN 1997–449946).
Derwent Abstract corresponding to EP 0 671 435 (AN 1995–312754 [41]).

* cited by examiner

Primary Examiner—David W. Wu
Assistant Examiner—Kelechi Egwim
(74) Attorney, Agent, or Firm—Brooks & Kushman P.C.

(57) ABSTRACT

Redispersible polymer powders are prepared by emulsion polymerization of ethylenical, unsaturated monomers in the presence of a protective colloidal stabilizer containing 20 to 95 weight percent of polymerized monomers containing sulfonic acid or sulfonate groups, 5 to 80 weight percent of polymerized monomers containing amide groups or hydroxylalkyl groups, and up to 5 weight percent of polymerized monomers which are hydrophobic, water-insoluble ethylenically unsaturated compounds. The redispersible polymers are suitable for use in construction materials and coatings, and exhibit higher water resistance than similar polymers stabilized with polyvinyl alcohol as a colloidal stabilizer.

9 Claims, No Drawings

PROCESS FOR PREPARING AQUEOUS POLYMER DISPERSIONS

BACKGROUND OF THE INVENTION

1) Field of the Invention

The invention relates to a process for preparing aqueous polymer dispersions, and also to their use for preparing water-redispersible polymer powders.

2) Background Art

Protective-colloid-stabilized aqueous polymer dispersions, for example for construction sector applications, are known. To ensure that the aqueous polymer dispersions are stable, protective colloids, such as polyvinyl alcohol, polyvinylpyrrolidone, cellulose or starch, are used during the polymerization in an aqueous medium. EP-A 133899 (U.S. Pat. No. 4,532,295) has disclosed starch-stabilized polymer dispersions. WO-A 84/00369 (U.S. Pat. No. 4,528,315) and EP-B 62106 (U.S. Pat. No. 4,397,968) describe dispersions stabilized using polyvinyl alcohol.

However, the addition of significant amounts of protective colloids, which are necessary to ensure sufficient stability, is attended by disadvantages: protective colloids are relatively expensive, their addition reduces the binder content of the dispersion, rheological disadvantages result and, finally, the addition of protective colloids makes the polymer films produced from the dispersion susceptible to attack by water. The susceptibility to attack by water is, in particular, undesirable in many applications in the construction sector and coatings sector, and has to be counteracted by subsequent steps during formulation. Reactivity with water is particularly disadvantageous in highly polymer-filled cement applications, such as sealing slurries.

To improve the water resistance of polymer films which have been prepared using protective-colloid-stabilized polymer dispersions EP-A 727441 recommends the use of water-soluble protective colloids based on from 5 to 50% of comonomers with acid and/or anhydride functions, from 0.1 to 80% of long-chain (meth)acrylates and up to 94.9% of water-insoluble principle monomers, such as (meth) acrylates or vinyl esters. A disadvantage is that these protective colloids are prepared by polymerization in organic solvents, and complicated solvent removal by distillation is required.

DE-A 2618898 (U.S. Pat. No. 3,965,032) describes protective colloids based on copolymer polyelectrolytes having nonionic hydrophobic units, such as methyl methacrylate, and hydrophilic units, such as ethylenically unsaturated comonomers substituted with sulfonate groups and prepared by polymerization in organic solvents. These protective colloids have disadvantages which are the same as the abovementioned EP-A 727441.

DE-A 19608911, which is a subsequent publication, discloses crosslinkable protective colloids having sulfonate-containing, N-methylol-containing and hydrophobic monomer units. A disadvantage is that when polymers stabilized with protective colloids of this type are used in acid media or exposed to heat they crosslink and therefore become brittle. This is contrary to the properties of flexibility required in many applications (sealing slurries, sealing compositions, and paints for bridging cracks).

EP-B 206814 describes the use of terpolymers made from (meth)acrylic acid and from sulfonate-functional monomer and vinyl esters for stabilizing aqueous systems which comprise dissolved or suspended solids, for example cooling water or boiler water.

EP-A 671435 discloses that copolymers made from alkyl acrylates and from sulfonate- or carboxylate-substituted monomers are suitable spraying aids for spraying protective-colloid-stabilized dispersions. EP-A 629650 (U.S. Pat. No. 5,462,978) describes copolymers made from sulfonic-acid-functional comonomers and from water-insoluble comonomers as spraying aids in the spray drying of aqueous polymer dispersions.

SUMMARY OF THE INVENTION

The object on which the invention was based was to provide protective-colloid-stabilized aqueous polymer dispersions which have better water resistance when used in the construction sector or coatings sector than previously known polymer dispersions, for example those stabilized with polyvinyl alcohol.

The invention provides a process for preparing protective-colloid-stabilized aqueous polymer dispersions by free-radical polymerization of ethylenically unsaturated monomers by emulsion polymerization, which comprises carrying out the polymerization in the presence of one or more protective colloids comprising a) from 5 to 95% by weight of monomer units containing sulfonic acid groups or sulfonate groups, b) from 5 to 95% by weight of noncrosslinkable, water-soluble monomer units, and c) from 0 to 5% by weight of hydrophobic monomer units selected from the class consisting of water-insoluble ethylenically unsaturated compounds, where the proportions in % by weight are based on the total weight of the copolymer.

DESCRIPTION OF THE REFERRED EMBODIMENTS

Suitable monomer units a) are water-soluble, free-radical-polymerizable, ethylenically unsaturated compounds which contain sulfonic acid groups and, respectively, sulfonate groups —$SO_3M$, where M=H, an alkali metal ion, an ammonium ion or an alkaline earth metal ion. Preference is given to 2-acrylamido-2-methylpropanesulfonic acid (AMPS), styrenesulfonic acid, sulfoalkyl (meth)acrylates, sulfoalkyl itaconates, in each case preferably having a $C_1$–$C_6$-alkyl radical, vinylsulfonic acid and ammonium, alkali metal or alkaline earth metal salts thereof. Particular preference is given to 2-acrylamido-2-methylpropane-sulfonic acid (AMPS), styrenesulfonic acid, sulfopropyl acrylate, sulfopropyl itaconate, vinylsulfonic acid and ammonium, sodium, potassium and calcium salts thereof.

Preferred monomer units b) are water-soluble, free-radical-polymerizable, ethylenically unsaturated compounds which contain carboxyl groups —COOM, where M=H, an alkali metal ion, ammonium ion or alkaline earth metal ion, or contain amide groups —$CONH_2$ or contain hydroxyl groups. Particular preference is given to acrylic acid, methacrylic acid, crotonic acid, itaconic acid, fumaric acid, maleic acid, hydroxyalkyl (meth)acrylates, such as hydroxyethyl acrylate or hydroxypropyl acrylate, hydroxybutyl acrylate, acrylamide and methacrylamide. Acrylamide and methacrylamide are most preferred.

For the purposes of the present invention, water-soluble generally implies solubility in water of at least 10% by weight at 23° C.

Suitable monomer units c) are free-radical-(co) polymerizable, ethylenically unsaturated compounds which have less than 4% by weight water-solubility at 23° C.

Preference is given to esters of acrylic or methacrylic acid with alcohols having from 1 to 18 carbon atoms, such as methyl methacrylate, methyl acrylate, N-butyl acrylate, 2-ethylhexyl acrylate; vinylaromatics, such as styrene or vinyltoluene; olefins, such as ethylene, propylene or butadiene; vinyl halides, such as vinyl chloride; vinyl esters of aliphatic carboxylic acids having from 1 to 18 carbon atoms, such as vinyl acetate, vinyl propionate, isopropenyl acetate, vinyl laurate, and vinyl esters of α-branched monocarboxylic acids having from 5 to 11 carbon atoms, such as VeoVa9® or VeoVa10®, Shell products which are vinyl esters of verstatic acid, or a saturated monocarboxylic acid mixture of highly branched C-9 and C-10 isomers.

Preferred protective colloids have
a) from 20 to 95% by weight of monomer units containing sulfonic acid groups and/or sulfonate groups and
b) from 5 to 80% by weight of monomer units containing carboxyl groups, amide groups or hydroxyalkyl groups, in particular protective colloids having
a) from 20 to 95% by weight of monomer units containing sulfonic acid groups or sulfonate groups and
b) from 5 to 80% by weight of monomer units containing amide groups, where the proportions in % by weight are in each case based on the total weight of the copolymer.

Particularly preferred protective colloids have
a) from 40 to 60% by weight of monomer units which derive from one or more monomers selected from the class consisting of 2-acrylamido-2-methylpropanesulfonic acid, styrenesulfonic acid, sulfoalkyl (meth) acrylates, sulfoalkyl itaconates, in each case preferably with a $C_1$–$C_6$-alkyl radical, vinylsulfonic acid and salts thereof, and
b) from 40 to 60% by weight of monomer units which derive from acrylamide and/or from methacrylamide.

The protective colloids are preferably prepared by free-radical polymerization in aqueous solution at a reaction temperature of preferably from 40 to 80° C. Initiation is by the usual water-soluble free-radical generators, preferably used in amounts of from 0.01 to 3.0% by weight, based on the total weight of the monomers. Examples of these are ammonium persulfate, potassium persulfate, hydrogen peroxide, potassium peroxodiphosphate, sodium peroxodiphosphate and ammonium peroxodiphosphate. If desired, the free-radical initiators mentioned may also, in a known manner, be combined with from 0.01 to 1.0% by weight, based on the total weight of the monomers, of reducing agents. Examples of suitable reducing agents are alkali metal formaldehyde sulfoxylates and ascorbic acid. To adjust the molecular weight, the regulators usually used may be added during the polymerization, for example mercaptans, aldehydes and chlorinated hydrocarbons. The copolymers are preferably used in the form of their aqueous solutions. Solids contents are preferably adjusted to from 15 to 25% by weight, depending on the applications.

The novel process is suitable for free-radical polymerization of ethylenically unsaturated monomers, for example of vinyl esters of unbranched or branched carboxylic acids having from 1 to 18 carbon atoms, of esters of acrylic or methacrylic acid with unbranched or branched alcohols having from 1 to 18 carbon atoms, of vinylaromatics, of vinyl halides and of olefins.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 or 9 to 11 carbon atoms, for example $VV5^R$, $VeoVa9^R$ or $VeoVa10^R$. Vinyl acetate is particularly preferred.

Preferred methacrylates or acrylates are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate and 2-ethylhexyl methacrylate. Particular preference is given to methyl acrylate, methyl methacrylate, n-butyl acrylate and 2-ethylhexyl acrylate.

Preferred vinylaromatics are styrene, α-methylstyrene, o-chlorostyrene or vinyltoluenes. Preferred vinyl halides are vinyl chloride and vinylidene chloride. Preferred olefins are ethylene, propylene, 1,3-butadiene and isoprene.

If desired, from 0.05 to 30.0% by weight, preferably from 0.5 to 15% by weight, based in each case on the total weight of the monomers, of one or more comonomers may also be added, for example for crosslinking or to modify the adhesion properties of the polymers prepared according to the invention. The amounts of crosslinking monomers used are preferably from 0.5 to 5.0% by weight, based on the total weight of the monomers. Examples of these are N-methylolacrylamide, N-(alkoxymethyl)acrylamides or N-(alkoxymethyl)methacrylamides having a $C_1$–$C_6$-alkyl radical, such as N-(isobutoxymethyl)acrylamide (IBMA), N-(n-butoxymethyl)acrylamide (NBMA); comonomers with more than one ethylenic unsaturation, such as ethylene glycol diacrylate, divinyl adipate, divinylbenzene, diallyl phthalate or triallyl cyanurate. Examples of comonomer units suitable for modifying adhesion properties are hydroxyalkyl methacrylates, and hydroxyalkyl acrylates, such as hydroxyethyl, hydroxylpropyl or hydroxylbutyl acrylate or methacrylate, and also compounds such as diacetoneacrylamide and acetylacetoxyethyl acrylate or methacrylate.

Using the novel method, the aqueous polymer dispersions are prepared by aqueous emulsion polymerization in the presence of from 1 to 20% by weight, preferably from 5 to 10% by weight, of one or more of the protective colloids mentioned, based in each case on the total weight of the monomers.

The polymerization temperature is generally from 35 to 95° C., preferably from 40 to 80° C. The polymerization may be carried out as a batch process, where all of the components are in the initial reactor charge, or by the feed process, where one or more components are added during the polymerization. Variants of mixing which have an initial charge and a feed are preferred. The feeds may be separate (spatially and chronologically) or some or all of the components to be fed may be preemulsified before being fed.

The protective colloids may be within the initial charge or in the feed, or divided between initial charge and feed. The protective colloids are preferably within the initial charge in the form of their aqueous solutions.

If, for example, gaseous reaction components are used, the emulsion polymerization may also be carried out at elevated pressure. For operations under elevated pressure, for example when using the monomers vinyl chloride or ethylene, pressures of from 5 bar to 100 bar are preferred. An example of a factor in the decision is the desired amount of ethylene to be polymerized.

The protective colloids toube used according to the invention may be used either alone or combined with emulsifiers. Accompanying emulsifiers may be anionic or nonionic emulsifiers. If the polymerization is carried out in the presence of emulsifiers, the amount of these is preferably up to 4% by weight, based on the total weight of the monomer phase. Preference is given to the use of anionic or nonionic emulsifiers. Examples of commonly used emulsifiers are ethoxylated fatty alcohols having a $C_8$–$C_{36}$-alkyl radical and an ethoxylation number (EO number) of from 3 to 50; ethoxylated mono-, di- and trialkylphenols having a $C_4$–$C_{10}$-alkyl radical and an EO number of from 3 to 50; alkali metal salts of di-$C_4$–$C_{12}$-alkyl esters of sulfosuccinic acid. Other suitable compounds are alkali metal salts and ammonium salts of $C_8$–$C_{12}$-alkyl sulfates, of ethoxylated alkanols having a $C_{12}$–$C_{18}$-alkyl radical and an EO number of from 3 to 30, of ethoxylated $C_4$–$C_{10}$-alkylphenols having an EO number of from 3 to 50, of $C_{12}$–$C_{18}$-alkylsulfonic acids, of $C_9$–$C_{18}$-alkylarylsulfonic acids and of sulfonates of ethoxylated, linear or branched $C_8$–$C_{36}$-alkylalcohols having an EO number of from 3 to 50. In the most preferred embodiment the polymerization is carried out without adding emulsifier.

The polymerization is initiated with the water-soluble, thermal initiators or redox-initiator combinations commonly used for emulsion polymerization. Examples of thermal initiators are organic peroxides, such as tert-butyl hydroperoxide and cumyl hydroperoxide, or persulfates, such as potassium persulfate, or $H_2O_2$, or azo compounds, such as azodiisobutyronitrile. Redox initiators preferably used are hydrogen peroxide, tert-butyl hydroperoxide or potassium persulfate combined with hydroxymethanesulfinic acid, ascorbic acid or sodium sulfite as reducing agent. The amount of initiator is preferably from 0.01 to 1.0% by weight, based on the total weight of the monomer phase.

To control the molecular weight, regulating substances may be used during the polymerization. The amounts of these used are usually from 0.01 to 5.0% by weight, based on the monomers to be polymerized, and they are fed separately or else premixed with reaction components. Examples of substances of this type are dodecylmercaptan, mercaptopropionic acid, methyl mercaptopropionate, isopropanol and acetaldehyde.

The aqueous dispersions obtainable by the novel process have a solids content of from 30 to 75% by weight, preferably from 40 to 65% by weight.

The protective-colloid-stabilized, aqueous polymer dispersions are also suitable for producing water-redispersible polymer powders. For this, the aqueous dispersions are dried. The dispersions are preferably spray-dried or freeze-dried. The dispersions are most preferably spray-dried.

As spraying aids, to ensure redispersibility it is necessary to add further water-soluble protective colloids to the dispersion prior to drying. These are different from the sulfonic-acid-functional or, respectively, sulfonate-functional protective colloids used for the polymerization. Examples of substances of this type which are widely commercially available are: polyvinyl alcohols, polyvinylpyrrolidone, cellulose derivatives, starch derivatives, and water-soluble condensation products made from melamine and formaldehyde or from naphthalenesulfonic acid and formaldehyde. Preference is given to polyvinyl alcohols. The amount of the spraying aid generally used is from 5 to 25% by weight, based on the polymeric constituents of the dispersion.

A content of up to 1.5% by weight of antifoam, based on the base polymer, has frequently proven advantageous during spraying. To increase storage capability by improving resistance to blocking, in particular for powders with a low glass transition temperature, the powder obtained can be admixed with an antiblocking agent (anticaking agent), preferably up to 30% by weight, based on the total weight of polymeric constituents.

Surprisingly, and despite their redispersibility, the dispersion powders obtained in this way give, for example in modifying hydraulically setting compositions of building materials, products with better water resistance than is given by conventional dispersion powders.

The protective-colloid-stabilized polymer dispersions and the dispersion powders obtainable therefrom are suitable as binders for coatings and renders, in particular paints; as adhesives or binders for wood, paper, textiles or nonwovens; as binders in papermaking and for producing molding compositions and moldings; as binders for use in the construction industry, in particular as additives to concrete, to construction adhesives, to mortars, to troweling compositions and to leveling compositions.

The examples below further illustrate the invention.
Preparation of the Protective Colloids

EXAMPLE 1

2600 g of water, 40 g of 50% strength acetic acid and 53 g of 10% strength NaOH formed the initial charge in a polymerization vessel of 15 liters volume with a stirrer and inlets for four feeds, and the mixture was heated to 60° C. The rotation rate was 180 rpm. Once the reaction conditions had been established, addition of 630 g of 20% strength aqueous sodium persulfate solution and 630 g of 10% strength aqueous ascorbic acid solution was begun, in each case at 245 g/h. After 5 minutes the monomer feed was begun, composed of 2610 g of 50% strength aqueous AMPS solution, 7260 g of 18% strength aqueous methacrylamide solution, 53 g of styrene and 200 g of 10% strength NaOH, at 5060 g/h. The regulator feed, composed of 133 g of acetone and 40 g of lauryl mercaptan, was begun at the same time, at 86.6 g/h. Both feeds ran for 120 minutes. The internal temperature was regulated so as to maintain a reaction temperature of 60° C. After the monomer feed had ended, feed of initiator continued for a further 30 minutes. The acetone was distilled off by applying slightly reduced pressure, and the mixture was then cooled and discharged.

This gave an aqueous polymer with a polymer content of 21.5%, a viscosity of 40 mPas (Brookfield BF20, 23° C.) and a pH of 4.5. The K value was 40.

EXAMPLE 2

334 g of water, 5.5 g of 50% strength acetic acid and 7.3 g of 10% strength NaOH formed the initial charge in a polymerization vessel of 3 liters volume with a stirrer and inlets for four feeds, and the mixture was heated to 60° C. The rotation rate was 180 rpm. Once the reaction conditions had been established, addition of 87 g of 20% strength aqueous sodium persulfate solution and 87 g of 10% strength aqueous ascorbic acid solution was begun, in each case at 55 g/h. After 5 minutes the monomer feed was begun, composed of 365 g of 50% strength aqueous AMPS solution, 1010 g of 18% strength aqueous methacrylamide solution, and 27.3 g of 10% strength NaOH, at 1400 g/h. The regulator feed, composed of 18.2 g of acetone and 5.5 g of lauryl mercaptan, was begun at the same time, at 23.7 g/h. Both feeds ran for 60 minutes. The internal temperature was regulated so as to maintain a reaction temperature of 60° C. After the monomer feed had ended, feed of initiator continued for a further 30 minutes. The acetone was distilled off by applying slightly reduced pressure, and the mixture was then cooled and discharged.

This gave an aqueous polymer with a polymer content of 21.6%, a viscosity of 25 mpas (Brookfield BF20, 23° C.) and a pH of 3.8. The K value was 28.

EXAMPLE 3

545 g of water, 5.5 g of 50% strength acetic acid and 7.3 g of 10% strength NaOH formed the initial charge in a polymerization vessel of 3 liters volume with a stirrer and inlets for four feeds, and the mixture was heated to 0° C. The rotation rate was 300 rpm. Once the reaction conditions had been established, addition of 87 g of 20% strength aqueous sodium persulfate solution and 87 g of 10% strength aqueous ascorbic acid solution was begun, in each case at 34 g/h. After 5 minutes the monomer feed was begun, composed of 295 g of 50% strength aqueous AMPS solution, 818 g of 18% strength aqueous methacrylamide solution, 73.7 g of methacrylic acid and 27.3 g of 10% strength NaOH, at 607 g/h. The regulator feed, composed of 18.4 g of acetone and 5.5 g of lauryl mercaptan, was begun at the same time, at 12 g/h. Both feeds ran for 60 minutes. The internal temperature was regulated so as to maintain a reaction temperature of 60° C. After the monomer feed had ended, feed of initiator continued for a further 30 minutes. The acetone was distilled off by applying slightly reduced pressure, and the mixture was then cooled and discharged.

This gave an aqueous, polymer with a polymer content of 21.9%, a viscosity of 27 mPas (Brookfield BF20, 23° C.) and a pH of 4.5. The K value was 26.

Preparation of the Protective-colloid-stabilized Dispersions

EXAMPLE 4

4600 g of water, 2000 g of the protective colloid from Example 2, and also 3650 g of vinyl acetate formed the initial charge in an autoclave of 15 liters volume with a stirrer and inlets for three feeds, and also an ethylene supply, and the mixture was heated to 65° C. The rotation rate was 300 rpm. 64 bar of ethylene pressure were then applied and the ethylene supply was shut off. Once the reaction conditions had been established, 380 g of 3% strength aqueous potassium persulfate solution and 380 g of 1.5% strength aqueous Brüggolit solution were fed, in each case at 60 g/h. 45 minutes after the start the initiator feed was increased to 90 g/h. After 80 minutes, 1620 g of vinyl acetate were fed at 700 g/h. The internal temperature was regulated so as to maintain a reaction temperature of 65° C. The pressure was held at 75 bar until the desired amount of ethylene was reached. Once monomer feed had ended, the initiator feed continued for a further hour. The mixture was then cooled and, from 60° C. released with pressure reduction into a suitable reactor, as a result of which excess ethylene was disposed of into the exhaust-gas system. To reduce residual monomers, 40 g of tert-butyl hydroperoxide (10% strength) and 40 g of Brüggolit (10% strength) were added and the mixture was stirred for 1 hour. 15 g of Hydrol W (commercially available product from Biochema Schwaben) were then added to the dispersion as preservative, and it was discharged via a 0.5 µm screen.

This gave a dispersion with a polymer content of 50.3%, a viscosity of 50 mPas (Brookfield BF20, 23° C.) and a pH of 3.0. The dynamic glass transition temperature was −14° C. Determination of particle size distribution by Coulter LS230 gave a Dw of 830 nm.

EXAMPLE 5

1500 g of water, 653 g of a 21.5% strength aqueous solution of the protective colloid from Example 1, and also 1190 g of vinyl acetate formed the initial charge in an autoclave of 5 liters volume with a stirrer and inlets for three feeds, and also an ethylene supply, and the mixture was heated to 65° C. The rotation rate was 300 rpm. 64 bar of ethylene pressure were then applied and the ethylene supply was shut off. Once the reaction conditions had been established, 150 g of 3% strength aqueous potassium persulfate solution and 150 g of 1.5% strength aqueous Brüggolit solution were fed, in each case at 30 g/h. After 60 minutes, 530 g,of vinyl acetate were fed at 264 g/h. The internal temperature was regulated so as to maintain a reaction temperature of 65° C. The pressure was held at 75 bar until the desired amount of ethylene was reached. Once monomer feed had ended, the initiator feed continued for a further hour. The mixture was then cooled and, from 60° C., released with pressure reduction into a suitable reactor, as a result of which excess ethylene was disposed of into the exhaust-gas system. To reduce residual monomers, 13 g of tert-butyl hydroperoxide (10% strength) and 13 g of Brüggolit (10% strength) were added and the mixture was stirred for 1 hour. 3 g of Hydrol W (commercially available product from Biochema Schwaben) were then added to the dispersion as preservative, and it was discharged via a 0.5 µm screen.

This gave a dispersion with a polymer content of 51.3%, a viscosity of 70 mPas (Brookfield BF20, 23° C.) and a pH of 3.1. The dynamic glass transition temperature was −9° C. Determination of particle size distribution by Coulter LS230 gave a Dw of 850 nm.

EXAMPLE 6

405 g of water, 411 g of 21% strength aqueous solution of the protective colloid from Example 2, and also 24 g of styrene and 24 g of butyl acrylate formed the initial charge in an autoclave of 3 liters volume with a stirrer and inlets for three feeds, and the mixture was heated to 75° C. The rotation rate was 220 rpm. Once the reaction conditions had been established, 155 g of 3% strength aqueous potassium persulfate solution and 155 g of 1.5% strength aqueous Brüggolit solution were fed, in each case at 50 g/h. After 5 minutes, 455 g of styrene and 455 g of butyl acrylate were fed at 303 g/h. The internal temperature was regulated so as to maintain a reaction temperature of 75° C. Once monomer feed had ended, the initiator feed continued for 2 hours. The mixture was then cooled. To reduce residual monomers, 4.2 g of tert-butyl hydroperoxide (10% strength) and 4.2 g of Brüggolit (10% strength) were added and the mixture was stirred for 1 hour. 3 g of Hydrol W (commercially available product from Biochema Schwaben) were then added to the dispersion as preservative, and it was discharged via a 0.5 µm screen.

This gave a dispersion with a polymer content of 43.1%, a viscosity of 50 mpas (Brookfield BF20, 23° C.) and a pH of 2.4. The dynamic glass transition temperature was 19° C. Determination of particle size distribution by Coulter LS230 gave a Dw of 340 nm.

EXAMPLE 7

1340 g of water, 705 g of a 21% strength aqueous solution of the protective colloid from Example 3, and also 1300 g of vinyl acetate formed the initial charge in an autoclave of 5 liters volume with a stirrer and inlets for three feeds, and also an ethylene supply, and the mixture was heated to 65° C. The rotation rate was 300 rpm. Once the reaction conditions had been established, 245 g of 3%, strength aqueous potassium persulfate solution and 245 g of 1.5% strength aqueous Brüggolit solution were fed, in each case at 30 g/h. After 60 minutes, 575 g of vinyl acetate were fed at 230 g/h. The internal temperature was regulated so as to maintain a reaction temperature of 65° C. The pressure was held at 75 bar from 70 minutes after the start of the reaction until monomer feed ended. Once monomer feed had ended, the initiator feed continued for 2 hours. The mixture was then cooled and, from 60° C., released with pressure reduction into a suitable reactor, as a result of which excess ethylene was disposed of into the exhaust-gas system. To reduce residual monomers, 12 g of tert-butyl hydroperoxide (10% strength) and 12 g of Brüggolit (10% strength) were added and the mixture was stirred for 1 hour. 3 g of Hydorol W (commercially available product from Biochema Schwaben) were then added to the dispersion as preservative, and it was discharged via a 0.5 μm screen.

This gave a dispersion with a polymer content of 50.5%, a viscosity of 30 mPas (Brookfield BF20, 23° C.) and a pH of 5.7. The dynamic glass transition temperature was –8° C. Determination of particle size distribution by Coulter LS230 gave a Dw of 920 nm.

To assess the water resistance of the dispersion polymers obtainable using the novel process, the resistance of the polymer films obtainable therewith and the resistance of dry mortar compositions modified using the dispersion polymers were tested: Water resistance of the polymer film:

A dispersion film of wet thickness 500 μm was drawn on a glass plate using a doctor. The film was then dried at 60° C. for 24 h. To test the water resistance a pipette was used to place a drop of water on the film. After 60 sec the drop of water was rubbed over the film and the water resistance was assessed visually. The higher the water resistance, the lower the degree of dispersion of the film in water. The water resistance was evaluated qualitatively using the following grading system:

Grade 1: film does not disperse at all
Grade 2: film disperses only partially
Grade 3: film disperses slowly
Grade 4: film disperses immediately Water Resistance of the Cement Film Equal parts by weight of cement and dispersion (solid/solid) were used to prepare a dry mortar which was converted into a usable composition by adding water. A doctor was used to draw a cement film of 500 μm thickness, and this was dried for 48 h at room temperature. A pipette was used to place a drop of water on this cement film, and the whitening of the film and the dispersion when rubbed with the finger were assessed visually. The water resistance was evaluated qualitatively using the following grading system:

Grade 1: film does not whiten or disperse
Grade 2: film whitens somewhat but does not disperse
Grade 3: film whitens severely and disperses to some extent
Grade 4: film disperses markedly
Grade 5: film disperses completely For comparison, as Comparative Example 1, a polyvinyl-alcohol-stabilized vinyl acetate-ethylene copolymer dispersion (ethylene content: 11%) and, as Comparative Example 2, a polyvinyl-alcohol-stabilized vinyl acetate-ethylene copolymer dispersion (ethylene content: 21%) were used. The results are given in the table. The dispersions obtained using the novel process exhibit good water resistance, both in the dispersion film and in the cement film. In contrast, the comparative examples show that the polyvinyl-alcohol-stabilized products are very susceptible to attack by water.

TABLE

| | Water resistance | |
|---|---|---|
| Example | Polymer film | Cement film |
| Ex. 4 | 1 | 1 |
| Ex. 5 | 1 | 1 |
| Ex. 6 | 1 | 1 |
| Ex. 7 | 1 | 1 |
| Comp. Ex. 1 | 4 | 4 |
| Comp. Ex. 2 | 4 | 4 |

We claim:

1. A process for preparing protective-colloid-stabilized aqueous polymer dispersions of water insoluble polymers suitable for the preparation of water-redispersible polymer powders, by free-radical emulsion polymerization of ethylenically unsaturated monomers, which comprises carrying out the polymerization in the presence of one or more protective colloids comprising
    a) from 20 to 95% by weight of monomer units containing sulfonic acid groups or sulfonate groups,
    b) from 5 to 80% by weight of monomer units containing amide groups or hydroxyalkyl groups, and
    c) from 0 to 5% by weight of water-insoluble ethylenically unsaturated hydrophobic monomer units.

2. The process as claimed in claim 1, wherein the polymerization is carried out in the presence of protective colloids having
    a) from 40 to 60% by weight of monomer units which derive from one or more monomers selected from the class consisting of 2-acrylamido-2-methylpropane-sulfonic acid, styrenesulfonic acid, sulfoalkyl (meth)acrylates, sulfoalkyl itaconates, preferably in each case having a $C_1$–$C_6$-alkyl radical, vinylsulfonic acid and salts thereof, and
    b) from 40 to 60% by weight of monomer units which derive from acrylamide and/or from methacrylamide.

3. The process as claimed in claim 1, wherein one or more monomers selected from the class consisting of vinyl esters of unbranched or branched carboxylic acids having from 1 to 18 carbon atoms, esters of acrylic or methacrylic acid with unbranched or branched alcohols having from 1 to 18 carbon atoms, vinylaromatics, vinyl halides and olefins are polymerized.

4. A binder composition comprising the protective-colloid-stabilized polymer dispersion prepared by the process of claim 1.

5. A binder composition comprising the protective-colloid-stabilized polymer powder prepared by the process of claim 2.

6. An adhesive composition comprising the protective-colloid-stabilized polymer dispersion prepared by the process of claim 1.

7. The process of claim 1, wherein said polymer stabilized by said protective colloid is a polymer prepared by polymerizing vinyl acetate monomer and optionally one or more comonomers from the group of vinyl esters other than vinyl acetate, (meth)acrylates, and α-olefins.

8. The process of claim 1 wherein said polymer stabilized by said protective colloid is a polyvinyl acetate homopolymer or a polyvinyl acetate/ethylene copolymer.

9. The process of claim 1, wherein said ethylencially unsaturated monomers of the polymer of said aqueous polymer dispersion are selected from the group consisting of vinyl esters of branched or unbranched $C_{1-18}$ carboxylic acids, (meth)acrylic esters of $C_{1-18}$ branched or unbranched alcohols, vinylaromatic monomers, vinyl halide monomers, olefin monomers, and mixtures thereof, and wherein said polymers optionally contain from 0.5 to 5.0 percent by weight of one or more crosslinking monomers selected from the group consisting of N-methylolacrylamide, N—($C_{1-6}$alkoxymethyl)acrylamides, and N—($C_{1-6}$alkoxymethyl)methacrylamides; from 0.5 to 5.0 percent by weight of comonomers with more than one ethylenic unsaturation selected from the group consisting of ethylene glycol diacrylate, divinyl adipate, divinylbenzene, diallyl phthalate and triallyl cyanuarate; and/or 0.5 to 5.0 weight percent of adhesion-modifying comonomers selected from the group consisting of hydroxylalkyl methacrylates, hydroxyalkyl acrylates, diacetoneacrylamide, and acetylacetoxyethyl (meth)acrylate.

* * * * *

UNITED STATES PATENT AND TRADEMARK OFFICE
CERTIFICATE OF CORRECTION

PATENT NO. : 6,441,082 B1  Page 1 of 1
DATED : August 27, 2002
INVENTOR(S) : Hans-Peter Weitzel et al.

It is certified that error appears in the above-identified patent and that said Letters Patent is hereby corrected as shown below:

Column 10,
Line 66, delete "dispersion" and insert therefor -- dispersions --.
Line 67, delete "or" and insert therefor -- and --.

Column 11,
Line 1, delete "or" and insert therefor -- and --.
Line 9, before "comonomers" insert therefor -- one or more --.

Column 12,
Line 4, before "adhesion-modifying" insert therefor -- one or more --.

Signed and Sealed this

Fourth Day of February, 2003

JAMES E. ROGAN
*Director of the United States Patent and Trademark Office*